United States Patent [19]

Vyse et al.

[11] 4,203,321

[45] May 20, 1980

[54] METHOD AND APPARATUS FOR TESTING HYDRAULIC AND PNEUMATIC SYSTEMS

[75] Inventors: Gerrard N. Vyse, Bedford; Horise M. Cooke, Weatherford, both of Tex.

[73] Assignee: Stratoflex, Inc., Fort Worth, Tex.

[21] Appl. No.: 869,661

[22] Filed: Jan. 16, 1978

[51] Int. Cl.² .................................................. G01M 19/00
[52] U.S. Cl. ........................................... 73/168; 285/277
[58] Field of Search ................... 73/168, 497; 285/277, 285/316

[56] References Cited

U.S. PATENT DOCUMENTS

| | | | |
|---|---|---|---|
| 2,512,999 | 6/1950 | Bruning | 137/614.04 |
| 3,032,299 | 5/1962 | Martin | 137/614.04 X |
| 3,076,671 | 2/1963 | Freeman | 285/277 |
| 3,168,335 | 2/1965 | Sumption | 285/277 X |
| 3,270,557 | 9/1966 | McClocklin | 73/168 |
| 3,389,600 | 6/1968 | Rau | 73/168 X |

FOREIGN PATENT DOCUMENTS 2118088 10/1972 Fed. Rep. of Germany ............ 73/168
648266 10/1962 Italy ........................................ 285/137 R Primary Examiner—Richard C. Queisser
Assistant Examiner—Joseph W. Roskos
Attorney, Agent, or Firm—Merriam, Marshall & Bicknell

[57] ABSTRACT

This disclosure deals with apparatus for and a method of testing a plurality of hydraulic and/or pneumatic systems. Each such system has a hose connected in it and the hose terminates in a valved fitting. All of the fittings are releasably attached to a subassembly which in turn is attached to center member or a manifold. When the systems are to be tested, a test fixture is attached to the center member, such attachment automatically opening the valved fittings. The test fixture also includes valved fittings identical with those connected in the systems. All of the fittings are opened by attachment of the test fixture, and the appropriate tests are then carried out. When the systems are not being tested, the test fixture is removed and a protective cover is applied to the center member in place of the fixture.

11 Claims, 10 Drawing Figures

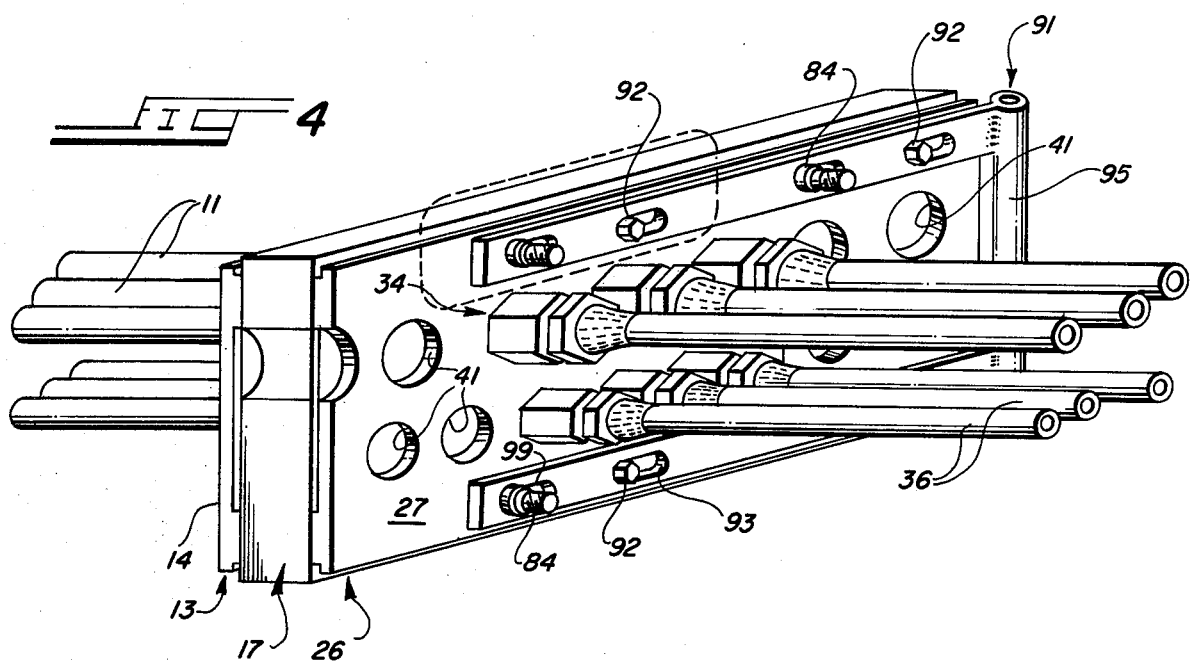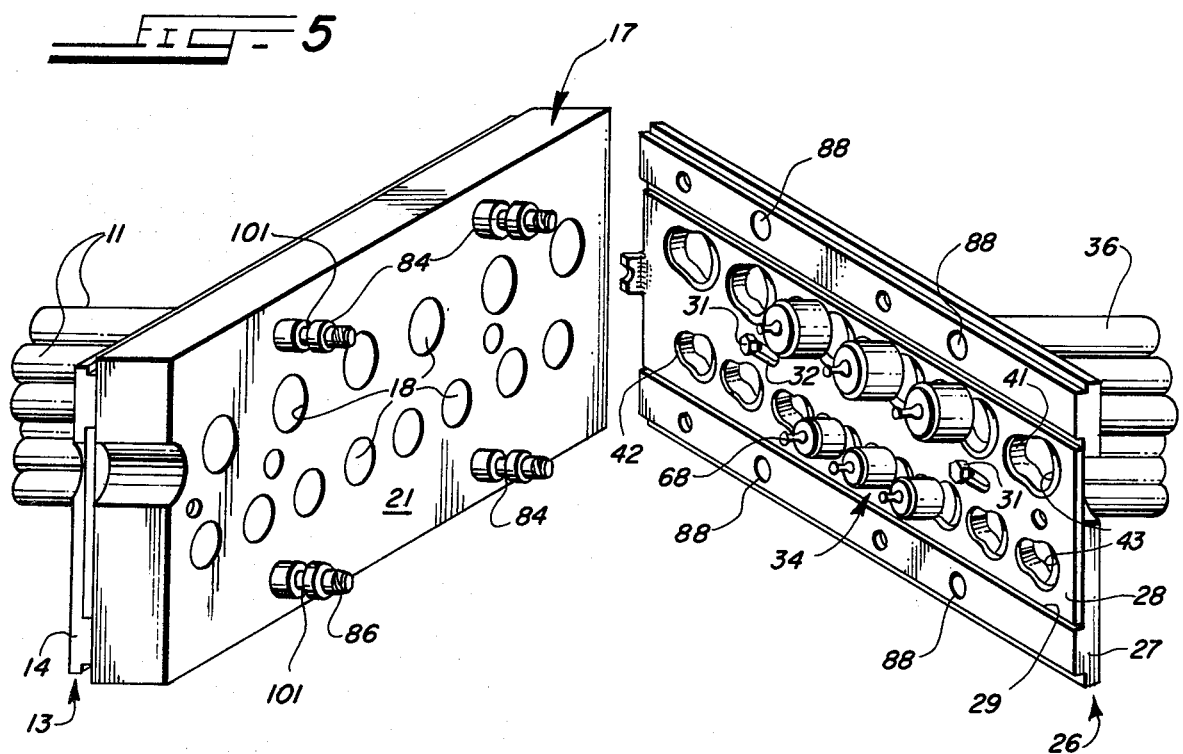

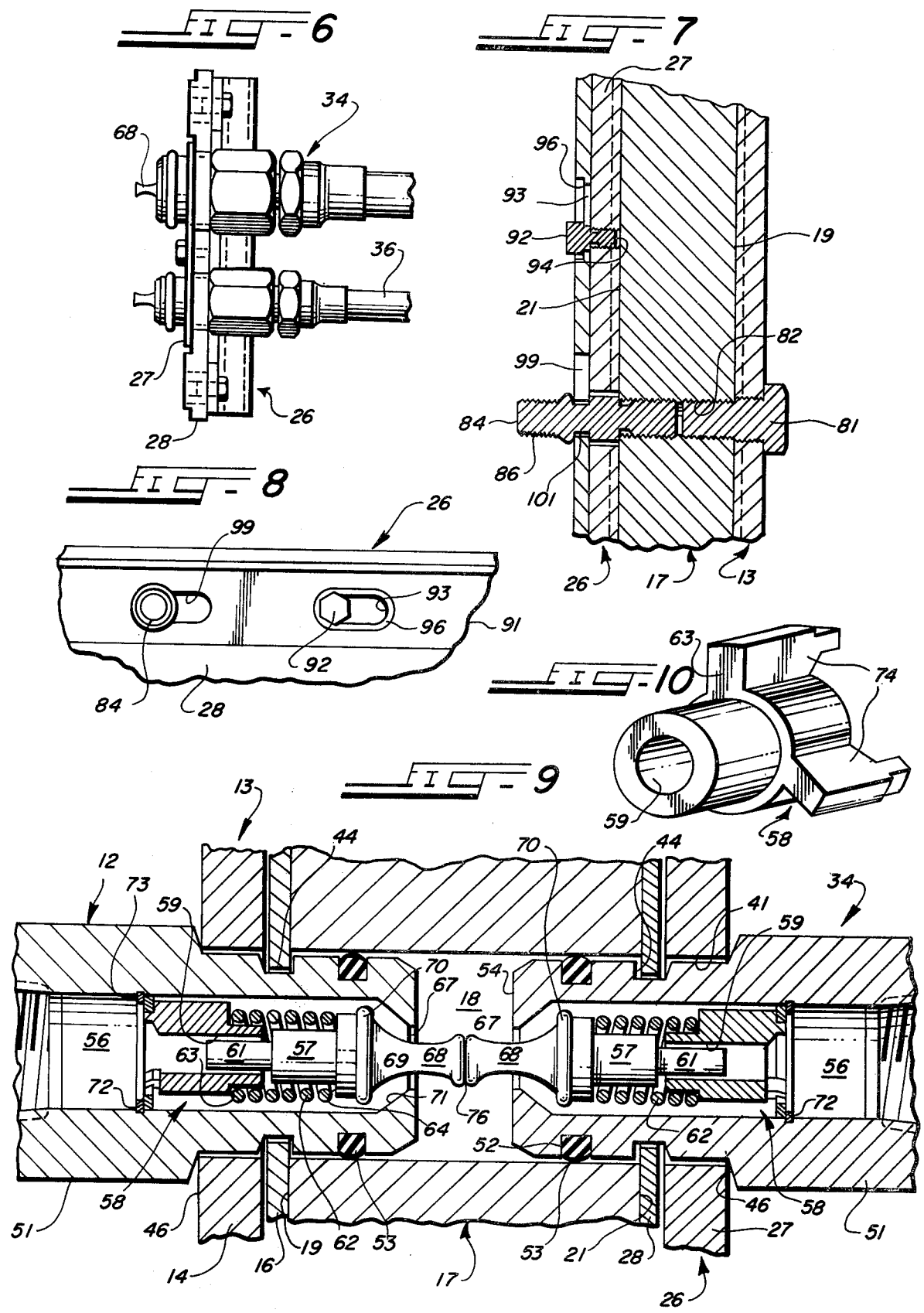

METHOD AND APPARATUS FOR TESTING HYDRAULIC AND PNEUMATIC SYSTEMS

U.S. patent application Ser. No. 734,462, filed Oct. 21, 1976 and titled Apparatus For Making Connections In Pneumatic And Hydraulic Systems, now U.S. Pat. No. 4,089,549, dated May 16, 1978 discloses apparatus for simultaneously making a plurality of connections between different pneumatic or hydraulic systems, or between parts of such systems. The application further discloses a method of testing such systems using the apparatus.

It is a general object of the present invention to provide apparatus of the foregoing general character, which is especially designed to facilitate periodic testing of hydraulic and/or pneumatic systems.

In accordance with the present invention, each system has a length of hose connected in it and a valved fitting is secured to the end of the length of hose. Each fitting includes a valve member which normally seals the fitting.

A plurality of such valved fittings are connected to a subassembly including two members which are movably attached to each other, movement of the members serving to attach the fittings to the subassembly. The subassembly is attached to a manifold. A test fixture including a plurality of such valved fittings is also attached to the manifold when the systems are to be tested, the valved fittings of the subassembly cooperating with the valved fittings of the fixture to automatically open all of the fittings, in order to make the tests possible.

The invention further comprises the method of testing one or more pneumatic and/or hydraulic systems comprising the steps of connecting a hose and valved fitting into each system, attaching the fittings to a manifold, connecting the manifold to a test fixture of a diagnostic test apparatus, the test fixture also including fittings, and the valved fittings of the subassembly and the fixture cooperating to automatically open each other.

The apparatus and method in accordance with the present invention will be better understood from the following detailed description taken in conjunction with the accompanying figures of the drawings, wherein:

FIG. 4 is a perspective view of apparatus in accordance with the present invention;

FIG. 5 is a partially exploded view of the apparatus shown in FIG. 4;

FIG. 6 is a side elevational view of a portion of the apparatus;

FIG. 7 is an enlarged fragmentary sectional view of another portion of the apparatus;

FIG. 8 is a fragmentary view of the portion of the apparatus enclosed by a dashed line in FIG. 4;

FIG. 9 is an enlarged fragmentary sectional view illustrating the operation of fittings of the apparatus; and FIG. 10 is a perspective view of a part of the fitting.

While the present invention is illustrated and described herein in connection with the pneumatic and/or hydraulic systems of an internal combustion engine and with a method of testing the systems of such an engine, it should be understood that the apparatus and method may also be used with other types of machines, and that the invention is not limited to use with any particular type of machine.

Figure 1:
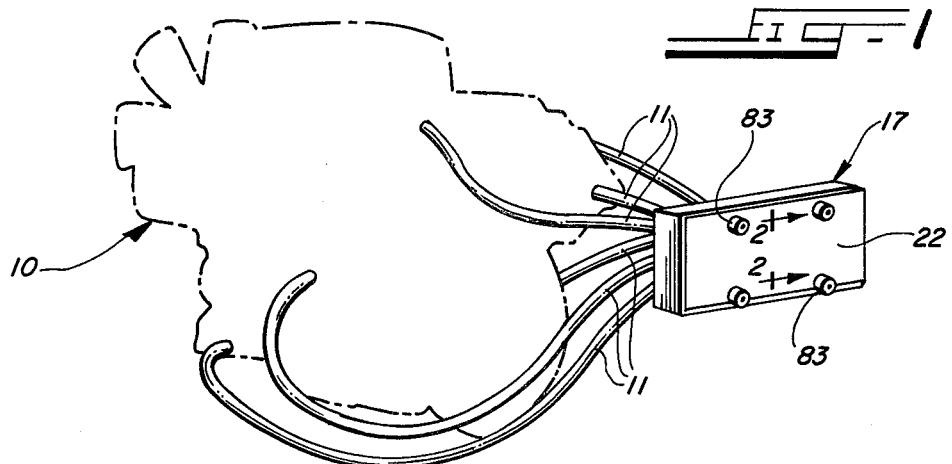
FIG. 1 is a perspective view of a machine including apparatus in accordance with the present invention.
Figure 2:
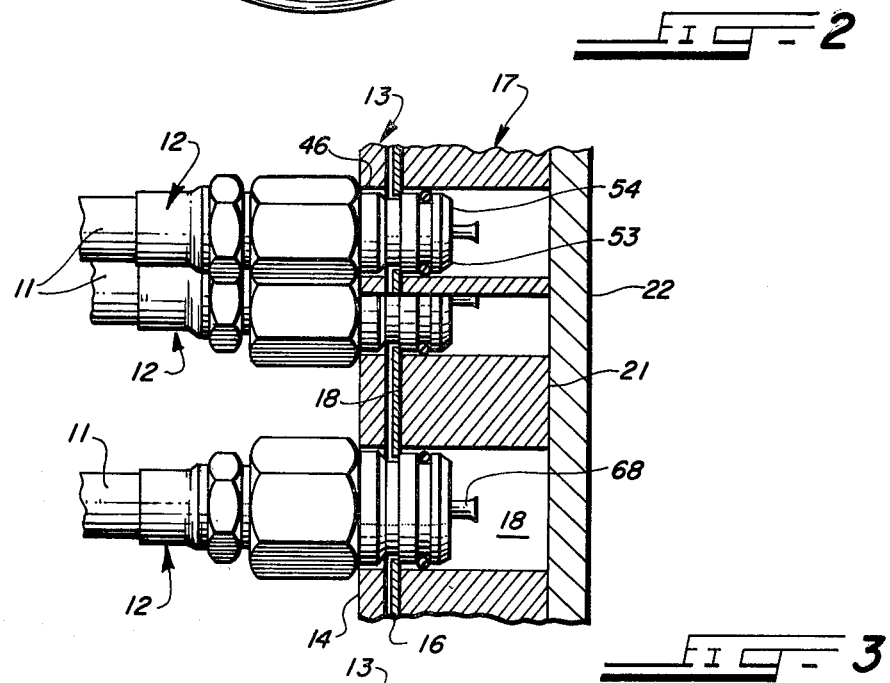
FIG. 2 is an enlarged sectional view taken on the line 2—2 of FIG. 1.

With reference to FIG. 1, the reference number 10 indicates an internal combustion engine of the reciprocating piston type. The engine is shown in outline form and may have a conventional construction. An engine for a truck, for example, includes a number of pneumatic and hydraulic systems such as fuel and lubricating oil systems, a coolant system, etc. Each of the pneumatic and/or hydraulic systems to be tested in accordance with the invention has a length of hose 11 connected in it. Each of the lengths of hose 11 terminates in a valved fitting 12 (FIGS. 2 and 3) constructed in accordance with the present invention, and each fitting 12 is releasably attached to a subassembly 13 (FIGS. 2 to 5) which includes a side plate 14 and a slide retainer 16 which cooperate to hold the fittings 12 as will be explained. The subassembly 13 is attached to a center member or manifold 17 which has a plurality of passages 18 formed therein, each of the fittings 12 extending into one end of one of the passages 18. The center member of manifold 17 has two flat parallel sides 19 and 21 (FIG. 2), and the passages 18 extend from the side 19 to the other side 21. As shown in FIG. 2, the fittings 12 extend into the passages 18 from the side 19 and are held in the passages by the attachment of the subassembly 13 to the manifold 17. A closure plate 22 is attached to the side 21 of the manifold 17 and covers the open ends of the passages 18 when tests are not being performed.

When the hydraulic and pneumatic systems to which the hose 11 are connected are to be tested, as will be described in more detail hereinafter, the closure plate 22 is removed from the side 21 and a test fixture comprising a second subassembly 26 (FIGS. 4, 5 and 9) is attached to the side 21 in place of the closure plate 22. The subassembly 26 also includes a side plate 27 and a slide retainer 28 which are similar to the side plate 14 and the slide retainer 16 of the subassembly 13.

The two subassemblies 13 and 26 are constructed generally similarly and are similar to the subassemblies disclosed in the above mentioned Vyse et al patent application Ser. No. 734,462.

With reference to FIG. 5, the side plate 27 of the subassembly 26 has a recess 29 formed therein in its side which contacts the side 21 of the manifold 17, and the slide retainer 28 is sized to snugly fit and move in the recess 29. The slide retainer 28 is movably attached to the side plate 27 by a plurality of bolts 31 which are located in elongated slots 32 formed in the slide retainer 28 and are threaded into the side plate 27.

The direction of elongation of the slots 32 is the same as the long direction of the recess 29, and consequently the slide retainer 28 is able to move in the recess a distance which is limited by the length of the slots 32. The enlarged heads of the bolts 31 overlie the inner side of the slide retainer 28 and hold the slide retainer 28 assembled with the side plate 27. The subassembly 26 is releasably connected to another group of valved fittings 34 which are attached to lengths of hose 36 (FIGS. 4, 5, 6 and 9). The fittings 12 and 34 may be identical, as shown in FIG. 9.

The fittings 12 are attached to the subassembly 13 and the fittings 34 are attached to the subassembly 26 by an arrangement similar to that described in detail in the previously mentioned patent application Ser. No. 734,462. This arrangement is also illustrated in FIG. 5 in connection with the subassembly 26. The side plate 27 has a hole 41 formed therein for each of the fittings 34, as shown in FIGS. 5 and 9. The slide retainer 28 also has an opening 42 formed therein for each fitting and for each hole 41, the openings 42 being enlarged at one end as indicated by the numeral 43 in FIG. 5. Each of the fittings 34, and similarly each fitting 12, has an annular groove 44 formed therein which is aligned with or is in the same plane as, the associated slide retainer when a shoulder 46 formed on the fitting engages the outer surface of the associated side plate. When the slide retainer 28 is manually moved to a disengaged position, which is toward the left from the position shown in FIG. 5, the enlarged portion 43 of the retainer opening 42 overlies the associated hole 41 formed in the side plate, and a fitting may then be inserted through the hole 41 and through the enlarged portion 43. After the fittings have been inserted through the holes 41 and the enlarged portions 43, the slide retainer 28 is manually moved toward the right as seen in FIG. 5 to the engaged position, and in the engaged position the margins of the openings 42 extend into the fitting grooves 44 and thus hold the fittings attached to the associated subassembly.

Figure 3:
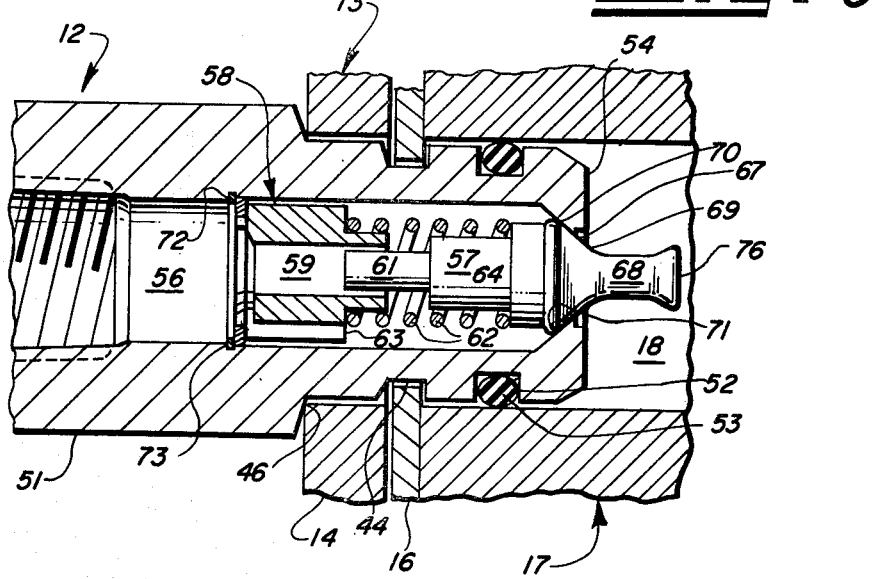
FIG. 3 is a further enlarged fragmentary sectional view of a fitting included in the apparatus.

With specific reference to FIGS. 3 and 9, each of the fittings 12 and 34 includes a body part 51 which has the previously mentioned annular groove 44 and the shoulder 46 formed thereon. Each of the body parts 51 further has an annular groove 52 formed on it adjacent its inner end, which receives an O-ring 53. The O-ring 53 of each fitting engages the inner wall of the associated passage 18 of the manifold 17, and forms a sealed connection between the fitting body 51 and the manifold 17. As shown in FIG. 2, while the hose and the fittings may have different diameter sizes, the distance from the shoulder 46 to the inner end surface 54 of the fitting body is the same for all fittings. The distance from the shoulder 46 to the groove 44 is of course the same for all fittings regardless of size.

The body part 51 of each fitting 12 and 34 has a centrally located flow passage 56 formed in it, which is in flow communication with the flow passage of the associated hoses 11 and 36. A movable valve member 57 is mounted axially within the passage 56 of each fitting. Each valve member 57 is supported by a member 58 which is mounted in the passage 56 behind the valve member 57. The support 58 has a central opening 59 formed in it which receives a reduced diameter shank 61 of the valve member 57. A compression spring 62 extends between shoulders 63 and 64 formed on the support 58 and the valve member 57, and the spring 52 urges the valve member toward the inner end of the fitting. The inner end of the body 51 has a central outlet opening 67 formed in it, and a reduced diameter pin or nose 68 of the valve member 57 extends out of the forward end of the body 51 through the opening 67. A conical surface 69 is formed on the nose 68 and an annular seal 70 is fastened to body member, the seal 70 being movable into engagement with a conical surface 71 formed on the inside of the passage 56 adjacent the opening 67. With specific reference to FIG. 3, in the absence of a force on the end surface 76 of the nose 68, the compression spring 62 moves the valve member 57 to the position where the seal 70 and the surface 71 tightly engage and seal the outlet opening 67.

With reference to FIGS. 9 and 10, the support 58 has a generally cylindrical center part and a plurality of radially extending legs 74. The rearward ends of the legs 74 are recessed and receive a ring 75, and the ring 75 engages a snap ring 72 which is mounted in an angular groove 73 formed in the inner periphery of the passage 56, the ring 72 preventing movement of the support 58 away from the outlet opening 67. The spaces between the legs 74 provide for the free flow of fluid through the body member 51 of the fitting.

As previously mentioned, the valve member 57 of each fitting includes a reduced diameter pin or nose 68 which extends through the outlet opening 67 and forwardly of the end surface 54 of the associated body member 51. When the valve member 57 is in the position where it seals the outlet opening 67, the forward end surface 76 of each nose 68 extends past the midway point of the passage 18, as shown in FIG. 2.

However, as shown in FIG. 9, when fittings are pressed into both ends of a passage 18, the end surfaces 76 of the valve members of the two fittings engage and the valve members of the two fittings are pushed backwards against the springs 62, thereby opening the outlet openings 67. Consequently, fluid in a length of hose 11 attached to a fitting 12 is placed in communication with the flow passages of the associated fitting 34 and hose 36.

The subassembly 13 is attached to the side 19 of the center member or manifold 17 by a plurality of bolts 81 (FIG. 7) which extend through holes formed along the side edges of the side plate 14 and into threaded holes 82 formed in the manifold 17. This manner of connection is similar to that shown in the previously mentioned patent application. The threaded holes 82 extend entirely through the manifold 17 as shown in FIG. 7, and either the cover plate 22 or the subassembly 26 is secured to the other side 21 of the center manifold 17 using four studs 84. As shown in FIG. 7, the studs 84 are screwed into the opposite ends of the holes 82 and they include threaded portions 86 adjacent their outer ends. An annular groove 101 is also formed on each stud 84 at a point which is spaced from the surface 21.

The cover or closure plate 22 has four holes formed in it which are located to receive the studs 84. The plate 22 is fastened to the manifold 17 by placing the plate 22 against the surface 21 and threading nuts 83 onto the portions 86, as shown in FIG. 1.

To fasten the subassembly 26 to the manifold 17, the nuts 83 are removed and the closure plate 22 is separated from the manifold 17. As is best shown in FIG. 5, the plate 27 of the subassembly 26 has four holes 88 formed in it along the sides, which receive the studs 84. A U-shaped slide latch 91 (FIGS. 4, 7 and 8) is movably attached to the outer surface of the plate 27 by screws 92 which extend through elongated slots 93 formed in the arms of the slide latch 91 and are threaded into holes 94 (FIG. 7) formed in the side plate 27. The slots 93 are formed in the two arms of the U-shaped latch, the two arms being connected by a handle 95. The head of each bolt 92 overlies a ledge 96 formed around each slot 93 and the heads hold the slide latch 91 assembled with the plate 27. However, due to the elongation of the slots 93, also shown in FIG. 8, the slide latch 91 may be moved, relative to the plate 27, between a locked position and an unlocked position.

Slots 99 are also provided in the slide latch 91 for the studs 84. In the unlocked position of the slide latch 91, shown in FIGS. 4 and 8, an enlarged portion of each slot 99 receives one of the studs 84. With the subassembly 26 in position against the side 21 of the manifold and the studs 84 extending through the slots 99, the slide latch 91 is moved toward the left as seen in FIGS. 4 and 8 to the locked position. The annular grooves 101 of the studs 84 are in the plane of the arms of the slide latch 91 when the parts are assembled, and the reduced diameter portions of the slots 99 are moved into the grooves 101 as shown in FIG. 7, thereby locking the subassembly 26 to the center member 17.

Summarizing briefly the use of the foregoing structure and the method of testing pneumatic and/or hydraulic systems utilizing the structure, the lengths of hose 11 are connected in the various systems of the engine 10 as previously mentioned and a valved fitting 12 is secured to the end of each length of hose 11. The manner of attachment of the hose and fittings is conventional and well known in the art. The fittings are connected to the subassembly 13 by first moving the slide retainer 16 to the disengaged position where the fittings 12 may be inserted through the holes in the plate 14 and in the retainer 16, and then moving the slide retainer 16 to the engaged position where it engages the fittings and holds them in assembled relation. The subassembly and the fittings attached thereto are then gang assembled with the manifold 17 by positioning the forward ends of the fittings 12 into the manifold openings 18 and then pressing the fittings 12 into the openings until the plate 14 engages the side 19 of the manifold 17. The manifold 17 is then secured to the side plate 14 using the bolts 81.

The hydraulic and/or pneumatic systems may then be tested by bringing the machine 10 to a diagnostic test apparatus which includes the test fixture or subassembly 26, the hose 36 and the fittings 34, the hose 36 being connected in the test systems of the apparatus. With slide latch 91 moved to the unlocked position, subassembly 26 and the manifold 17 are moved together with the studs 84 extending through the holes 88, and then the slide latch 91 is manually moved to the locked position which is shown in FIG. 7. As the fittings 34 of the subassembly 26 are pressed into the holes 18 of the manifold 17, the end surfaces 76 of the valve members 57 of the fittings 34 engage the end surfaces 76 of the valve members of the fittings 12, and all of the valve members are moved back against the forces of the compression springs 62. The seals 70 of the fittings are moved off of the valve seats or surfaces 71, and the flow passages of the fittings 12 and 34 are connected. The hose 36 and the fittings 34 of the test apparatus are preferably prefilled with fluid, and fluids from the hose 11 and the hose 36 fill the passages 18. The O-rings 53 of course seal the passages and prevent loss of fluid. Appropriate tests of the systems are then performed using the diagnostic test apparatus, which may have a conventional construction aside from the valved fittings 34 and the subassembly 26. After the tests have been completed, the slide latch 91 is manually moved to the unlocked position and the forces of the compression springs 62 of the two groups of fittings are sufficient to pop or push the subassembly 26 away from the side 21 of the manifold 17. The springs 62 move the seals 70 to the surfaces 71 and automatically close the valves of the fittings. Relatively little fluid of the systems is lost by reason of such testing, the only fluid loss being that in the passages 18 between the O-rings 53.

After testing as described above, the cover or closure plate 22 is attached to the side 21 of the manifold 17 using the nuts 83. At any later time when it is desired to test the systems, the plate 22 may be removed and the manifold connected to the test apparatus. The plate 22 is of course normally attached to the manifold during use of the machine, in order to protect the valves and to keep dirt out of the passages 18.

It will be apparent from the foregoing that an improved apparatus for testing machines such as engines, and an improved method of testing such hydraulic and pneumatic systems of such machines, has been provided. The pneumatic and hydraulic systems of an engine may be quickly and easily tested with little loss of fluid. When the tests are not being performed, the manifold and the subassembly 13 may be fastened in an appropriate out-of-the-way place and will not effect the operation of the machine.

We claim:

1. Apparatus for testing a plurality of pneumatic and/or hydraulic systems, comprising a length of hose connected in each of said systems, a valved fitting attached to each length of hose, each of said fittings including a normally closed valve, center member means attached to all of said fittings, a test fixture adapted to be connected to diagnostic test equipment for performing separate tests of said systems, said test fixture being attachable to said center member means and including valve means for automatically opening said valved fittings.

2. Apparatus as in claim 1, wherein said valve means of said test fixture comprises a plurality of valved fittings which are substantially the same as said first mentioned valved fittings.

3. Apparatus as in claim 1, wherein said valve means of said test fixture comprises a plurality of valved fittings connected to said test equipment, said valved fittings of said test fixture and said first mentioned valved fittings including interengageable means for automatically opening said fittings as said test fixture is attached to said center member means.

4. Apparatus comprising a center member having a plurality of passages formed therethrough, a first valved fitting positioned in one end of each of said passages, means attached to said first valved fittings and releasably fastening said first valved fittings to said center member, a second valved fitting positioned in the other end of each of said passages, means separate from said first named means and attached to said second valved fittings and releasably fastening said second valved fittings to said center member, each of said fittings making sealed engagement with the wall of the associated passage, each of said fittings further including a normally closed valve and valve opening means, said valve opening means of each of said first fittings engaging said valve opening means of one of said second fittings and thereby opening both of said valved fittings in a passage when said first named means and said last named means are attached to said center member.

5. Apparatus as in claim 4, wherein each of said valve opening means comprises pin means extending at least to the center of said center member passage, whereby said pin means of said first and second valved fittings engage at said center and open both of said valved fittings.

6. Apparatus comprising a center member having at least one passage formed therethrough, a first valved fitting positioned in one end of said passage, a second valved fitting positioned in the other end of said passage, each of said fittings making sealed engagement with the wall of the passage, each of said fittings further including a normally closed valve and valve opening means, said valve opening means of said first fitting engaging said valve opening means of said second fitting and thereby opening both of said valved fittings, said center member having a plurality of said passages formed therein, a first valved fitting being positioned in one end of each of said passages, and a second valved fitting being positioned in the other end of each of said passages, and further including a first subassembly connected to all of said first valved fittings and attached to said center member, a second subassembly connected to all of said second valved fittings, and means releasably attaching said second subassembly to said center member, each of said subassemblies including slide retainer means for forming a releasable connection with said fittings.

7. A method of testing a plurality of pneumatic and/or hydraulic systems, comprising the steps of connecting a hose and a valved fitting into each of said systems, connecting each of said fittings to a subassembly, attaching said subassembly to a center member, the center member having a plurality of passages through it and said fittings extending into said passages from one side of said center member, attaching said center member to a test fixture having means for automatically opening said valved fittings, and performing pressure tests of said systems using said test fixture.

8. A method according to claim 7, and further including the steps of detaching said center member from said test fixture, and attaching a cover to said center member in place of said test fixture.

9. Apparatus for use with test means for testing a plurality of hydraulic and/or pneumatic systems, each of said systems including a length of hose, said apparatus comprising a plurality of fittings adapted to be attached to the lengths of hose, a subassembly including plate means and slide retainer means, said plate and retainer means being movably connected together and releasably attached to said plurality of fittings, each of said fittings including normally closed valve means, and said valve means being automatically engageable with valve opening means of said test means when said subassembly is attached to said test equipment.

10. Apparatus as in claim 9, and further including a center member having a plurality of passages therein, said subassembly being attached to said center member with said fittings extending into said passages, said test means further being attached to said center member and said valve opening means extending into said passages and engaging said fittings.

11. Apparatus as in claim 9, wherein said valve opening means of said test means comprises a plurality of fittings which are identical with said first mentioned fittings.

* * * * *